United States Patent [19]

Batty, Jr.

[11] Patent Number: 5,303,943
[45] Date of Patent: Apr. 19, 1994

[54] HEAD GASKET ASSEMNLY AND METHOD FOR SEALING AN INTERNAL COMBUSTION ENGINE

[76] Inventor: James M. Batty, Jr., 2325 Bluebell Ave., San Jose, Calif. 95122

[21] Appl. No.: 966,604

[22] Filed: Oct. 26, 1992

Related U.S. Application Data

[63] Continuation of Ser. No. 486,903, Mar. 1, 1990, abandoned, which is a continuation-in-part of Ser. No. 292,251, Dec. 30, 1988, abandoned.

[51] Int. Cl.$^5$ .............................................. F16J 15/08
[52] U.S. Cl. .............................. 277/1; 277/234; 277/235 B
[58] Field of Search ............. 277/1, 235 B, 232, 234, 277/166, 178; 123/193 CH, 198 E, 198 F, DIG. 1, DIG. 6, DIG. 7; 285/397, 239; 403/292; 16/2

[56] References Cited

U.S. PATENT DOCUMENTS

| | | | |
|---|---|---|---|
| 1,398,612 | 11/1921 | Victor | 277/234 X |
| 1,557,775 | 10/1925 | Robertson | 277/235 B |
| 1,864,328 | 6/1932 | Victor | 277/232 |
| 2,195,547 | 4/1940 | Vickers et al. | 285/397 X |
| 3,108,818 | 10/1963 | Furstenburg | 277/235 B X |
| 3,167,324 | 1/1965 | Kratochvil | 277/235 B |
| 3,340,774 | 9/1967 | Brenneke | 123/193 CH |
| 3,363,608 | 1/1968 | Scherenberg et al. | 123/193 CH X |
| 3,473,813 | 10/1969 | Meyers et al. | 277/166 X |
| 3,659,139 | 4/1972 | Ernst et al. | 403/292 X |
| 3,664,676 | 5/1972 | Petersen | 277/166 |
| 3,765,385 | 10/1973 | Conrad | 123/193 CH X |
| 3,841,289 | 10/1974 | Meyers | 123/193 CH |
| 4,068,346 | 1/1978 | Binder | 403/292 X |
| 4,070,971 | 1/1978 | Studebaker | 123/198 F |
| 4,126,318 | 11/1978 | Belter | 277/235 B X |
| 4,282,627 | 8/1981 | Downing | 16/2 |
| 4,361,979 | 12/1982 | Peterson | 403/292 X |
| 4,405,138 | 9/1983 | Skrycki | 277/235 B |
| 4,505,486 | 3/1985 | Skrycki | 277/235 B |
| 4,534,572 | 8/1985 | Belter | 277/235 B |
| 4,597,594 | 7/1986 | Kacalieff et al. | 285/397 X |
| 4,714,260 | 12/1987 | Udagawa | 277/235 B |
| 4,781,158 | 11/1988 | Bauer et al. | 123/193 CH |
| 4,979,758 | 12/1990 | Miyaoh | 277/235 B |

FOREIGN PATENT DOCUMENTS

| | | | |
|---|---|---|---|
| 970583 | 1/1951 | France | 285/239 |
| 2568667 | 2/1986 | France | 285/239 |

Primary Examiner—William A. Cuchlinski, Jr.
Assistant Examiner—Scott W. Cummings
Attorney, Agent, or Firm—Fliesler, Dubb, Meyer & Lovejoy

[57] ABSTRACT

A method and apparatus for preventing the intermixing of coolant, lubricant and combustion gases in an internal combustion engine comprising a lamination of copper and non-asbestos paper for blocking off the majority of fluid passageways in the vehicle engine block and head assemblies so as to prevent fluid migration between the fluid passageways and the combustion chambers therein. The material of the head gasket is provided to be extruded into the blocked passageways so as to more effectively seal the passageways. An elongated hollow tubular insert is provided for use in the unblocked fluid passageways so as to afford additional protection against fluid migration between a fluid passageway and a combustion chamber in the engine.

20 Claims, 5 Drawing Sheets

HEAD GASKET ASSEMNLY AND METHOD FOR SEALING AN INTERNAL COMBUSTION ENGINE

This application is a continuation of Ser. No. 07/486,903, filed Mar. 1, 1990 now abandoned, which is a continuation-in-part of Ser. No. 07/292,251, filed Dec. 30, 1988, now abandoned.

BACKGROUND OF THE INVENTION

1. Field of the Invention

The present invention relates to a method and an apparatus for preventing the intermixing of coolant, lubricant and combustion gases in an internal combustion engine in general and in particular to a method and apparatus comprising a novel head gasket which may be used separately or in combination with a novel insert for retaining coolant and lubricants within passageways provided therefor within such engines.

2. Description of the Prior Art

Typical automobile and truck engines comprise block assembly and a head assembly which are bolted together with a head gasket disposed therebetween. The block assembly comprises cylinder and piston assemblies and a plurality of passageways for circulating coolant and lubricant therein. The head assembly comprises intake and exhaust valve assemblies and, likewise, a plurality of passageways for circulating coolant and lubricant therein. The head gasket comprises a plurality of holes of various sizes and shapes to accommodate the cylinders, mounting bolts and openings in the fluid passageways which are used for circulating coolant and lubricant between the block and head assemblies.

During normal operation, relatively high internal temperatures and pressures are developed in the engine combustion chambers, coolant passageways and lubricant passageways. At the interface between the block and head assemblies, the only means available for isolating the combustion gases, coolant and lubricant is the head gasket.

Due to heat expansion, engine aging, extensive use, poor maintenance and/or poor operating techniques, the material in a conventional head gasket may deteriorate under fluid and gas pressure, allowing cooling fluid, e.g. steam, from the coolant passageways, oil from the lubricant passageway and gases from the combustion chambers to migrate through cracks or holes in the gasket and become mixed with the lubricant. This causes the lubricant to lose its lubricating properties, produces sludge, poor combustion, polluted exhaust and further deterioration of engine components, if not total engine failure.

One would expect that the openings of the coolant passageways in the block and head assemblies of a particular engine which are intended to be in communication with each other would be of a corresponding size and shape and that the manufacturer's recommended head gasket therefore would have holes of a corresponding size and shape. However, this is not the case with respect to many engines. On the contrary, it has been found that in many engines a number of the openings in the coolant passageways in the block assembly are of a different size and shape from those of the openings in the coolant passageways in the head assembly with which they are intended to communicate. Indeed, it has been found that sometimes the openings in the corresponding coolant passageways are not only of a different size and shape, but are also not aligned or are only partially in registration. Further, it has been found that often a head gasket which is recommended by a manufacturer for an engine has holes which do not conform in size and shape to the holes in the passageways in the block and head assemblies with which it is intended to be used and in some cases do not have one or more holes where a hole would be expected, thus blocking the passageway.

Another problem associated with conventional head gaskets is the proximity of the holes therein to each other. With holes relatively close to each other, e.g. a coolant hole and a combustion chamber hole, the probability of coolant migrating into the combustion chamber is significantly increased.

SUMMARY OF THE INVENTION

In view of the foregoing, it has been found that the number of coolant passageways conventionally used in block and head assemblies exceeds that which is necessary for adequate engine cooling. Indeed, tests have shown that an engine from a 1988 Chevrolet Silvarado pickup truck actually ran cooler with the head gasket of the present invention closing off a majority of the coolant passageways between the head and block assemblies, i.e. all but two of the passageways, than when a conventional head gasket specified by the manufacturer was used. Thus, by blocking off all except one or two of the passageways which are furthest from the nearest combustion chamber hole and lubricant passageway, the probability of coolant migration into a combustion chamber or lubricant passageway is significantly reduced and the engine runs cooler. Accordingly, principal objects of the present invention are a method and apparatus comprising a novel head gasket which effectively closes off, i.e. blocks, a majority of the coolant passageways between a block and head assembly in vehicle engines.

In accordance with the above objects, the head gasket of the present invention comprises a lamination of copper and non-asbestos paper. Specifically, a sheet of non-asbestos paper is covered by a top and bottom sheet of copper with the edges of one of the two sheets of copper being folded over the edges of the non-asbestos paper and the other sheet of copper so as to fully enclose the non-asbestos paper therebetween. Holes are provided in the gasket which conform in size, shape and location to the holes in the block and head assemblies used for the combustion chamber, the lubricant passageways, the mounting bolts and one or two coolant passageways. All other fluid passageways are blocked.

Another object of the present invention is a head gasket as described above in which the copper sheets are of a thickness and hardness which allows the copper to be extruded into the blocked holes so as to more effectively seal the holes.

In another embodiment of the present invention there is provided an elongated hollow tapered insert which is provided for insertion in the mouths of the one or two chosen open coolant passageways in the block and head assemblies. The insert is provided to further insure against the migration of coolant through the gasket.

The insert of the present invention is provided with a pair of centrally located annular tapered surfaces which are seated against corresponding countersunk surfaces provided therefor in the unblocked coolant passageways so as to form a tight seal therewith when the block and head assemblies are bolted together.

In those engines having coolant and lubricant passageways in a block which have a size, shape and location corresponding to coolant and lubricant passageways in a head, the inserts of the present invention can be used with a conventional head gasket to reduce, if not prevent, the migration of combustion gases, coolant and lubricant from damaging the gasket. All that is required is to provide the countersunk surfaces in the mouths of each of the passageways so as to prepare them to receive the tapered annular sealing surfaces of the insert.

In a preferred embodiment of the present invention, the inserts are made of solid brass. However, other materials which are compatible with engine materials, pressures and temperatures may also be used.

BRIEF DESCRIPTION OF THE DRAWINGS

The above and other objects, features and advantages of the present invention will become apparent from the following detailed description of the accompanying drawings, in which.

DETAILED DESCRIPTION OF THE DRAWINGS

Figure 1:
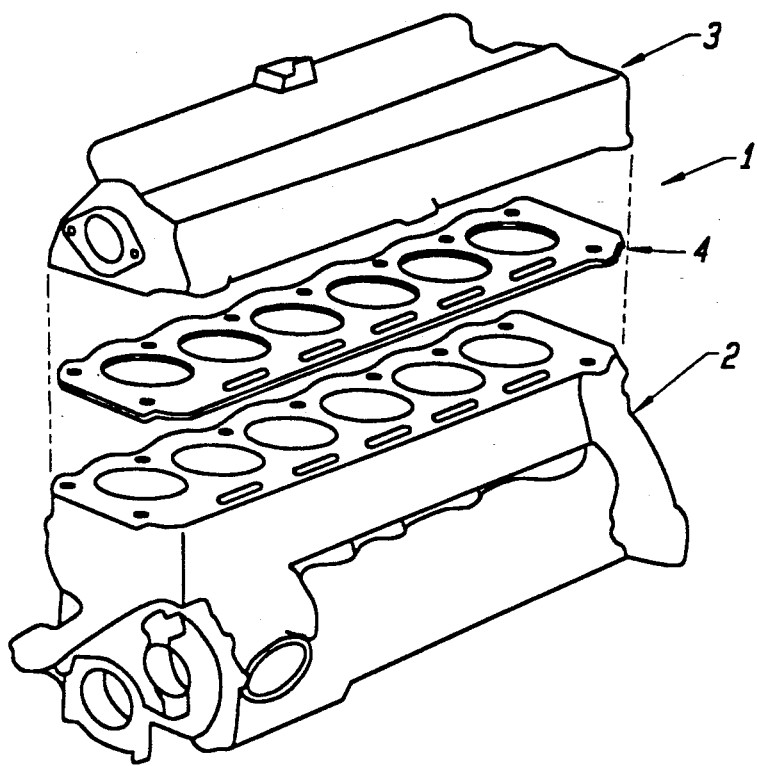
FIG. 1 is an exploded view of a conventional six-cylinder automobile engine.

Referring to FIG. 1, there is represented a conventional vehicle engine designated generally as 1, comprising a block assembly 2, a head assembly 3 and a head gasket 4. The gasket 4 is clamped between the block assembly 2 and the head assembly 3 when the head assembly 3 is bolted to the block assembly 2 in a conventional manner. As is well known, the purpose of the gasket 4 is to form a seal between the block assembly 2 and head assembly 3 for isolating the combustion chambers, fluid passageways and oil passageways in each of the assemblies when the block and head assemblies are bolted together with a predetermined amount of torque specified by the manufacturer thereof.

Figure 4:
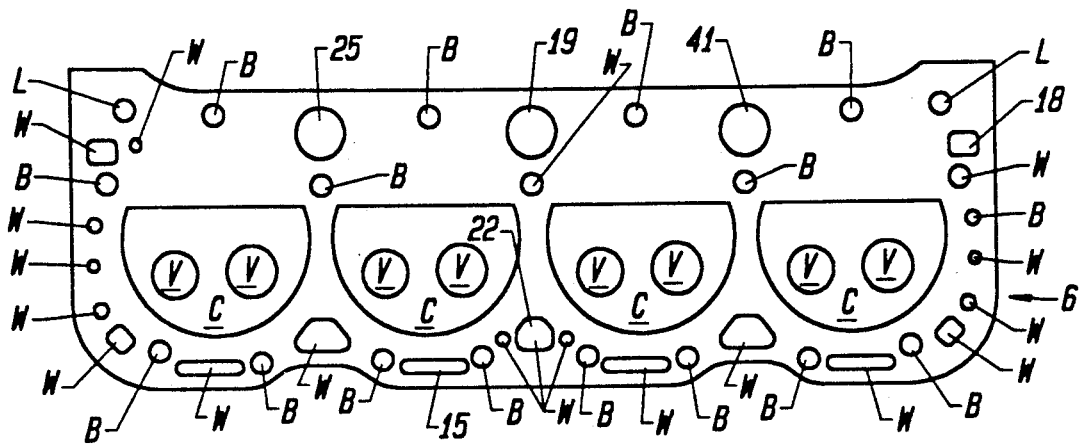
FIG. 4 is a plan view of a conventional head used with the block of FIG. 2 and head gasket of FIG. 3.
Figure 3:
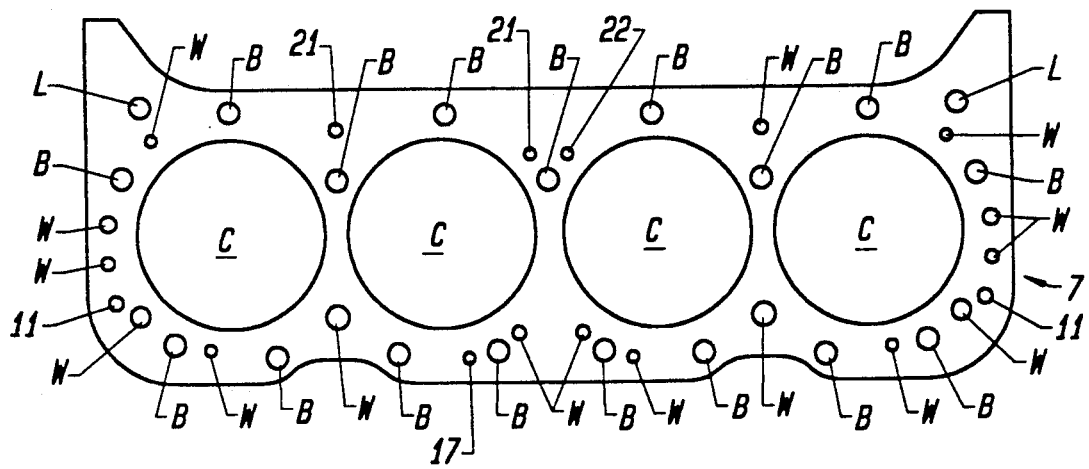
FIG. 3 is a plan view of a conventional head gasket used with the block of FIG. 2.
Figure 2:
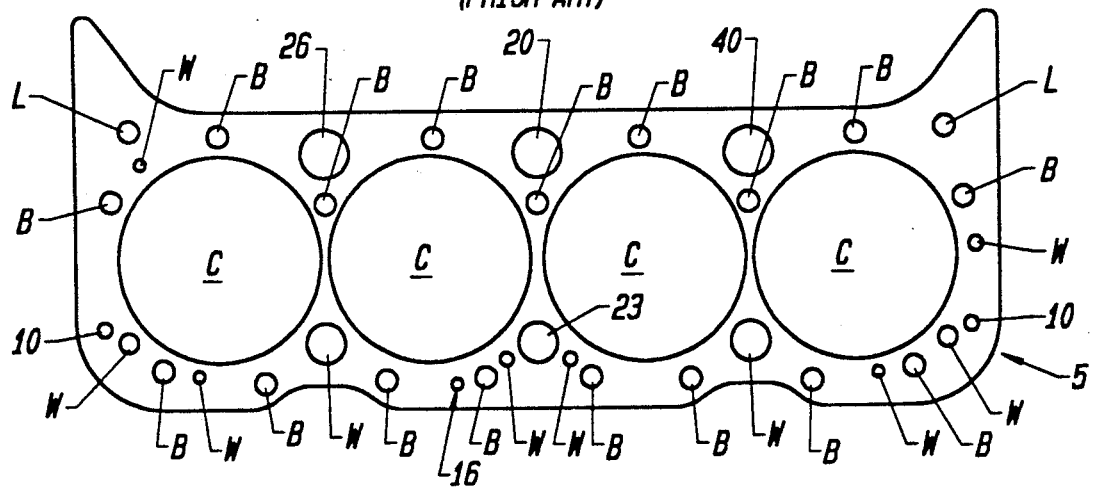
FIG. 2 is a plan view of a conventional four-cylinder block used in a V8-cylinder vehicle engine.

Referring to FIGS. 2-4, there is shown plan views of a block assembly 5, head assembly 6 and a head gasket 7 for a V8-cylinder engine used in a 1981 Malibu Classic/305 General Motors Chevrolet vehicle which correspond in function to the block assembly 2, head assembly 3 and head gasket 4 of FIG. 1.

As seen in each of the figures, there is provided a plurality of holes designated B. The holes B are provided for receiving mounting bolts which are used for bolting the head assembly 6 to the block 5 with the head gasket 7 located therebetween. In addition to the bolt holes B there is provided a pair of holes designated L which are holes through which lubricating fluid such as oil is pumped from the block assembly 5 to the head assembly 6 and four holes designated C for accomodating the cylinder and piston assemblies. In FIG. 4, a plurality of circles marked V represent intake and exhaust valves. In the lower right and left corners of the block assembly 5 of FIG. 2, there is provided a pin 10. In the gasket 7 there is provided therefor a pair of holes 11. Pin 10 comprises an aligning pin to assist aligning the gasket 7 and head 6 on the block 5. In addition to the mounting bolt holes B and oil holes L, there is provided a plurality of other holes W which are in communication with coolant passageways in the block assembly 5 and head assembly 6. As will be noted, a number of these latter holes differ in size, shape and location from the corresponding hole with which they are intended to communicate. For example, one of the coolant holes designated 15 in the head assembly 6 shown in the lower left center of FIG. 4 comprises an elongated kidney-shaped hole. The corresponding hole in the block assembly 5 comprises a small circular hole 16. A corresponding circular hole 17 is provided in the head gasket 7. It can be seen that the hole 15 differs in size and shape from the holes 16 and 17. In the upper right corner of the head assembly 6 there is provided a generally square coolant hole 18. It can be seen that there is no corresponding hole in either the block assembly 5 or the head gasket 7. Located in the upper center of the head assembly 6 and the block 5, there is provided a pair of coolant holes 19 and 20, respectively. The corresponding holes in the head gasket 7 appear to be two small circular holes 21, 22. In the lower center of the head assembly 6 there is provided a generally square coolant hole 22. The corresponding hole in the block assembly 5 comprises a generally circular hole 23. There is no corresponding hole in the head gasket 7.

A comparison of the holes in the block assembly 5, the head assembly 6 and the head gasket 7 will reveal still other differences in the size, shape and location of corresponding holes in each of the described component parts.

Figure 5:
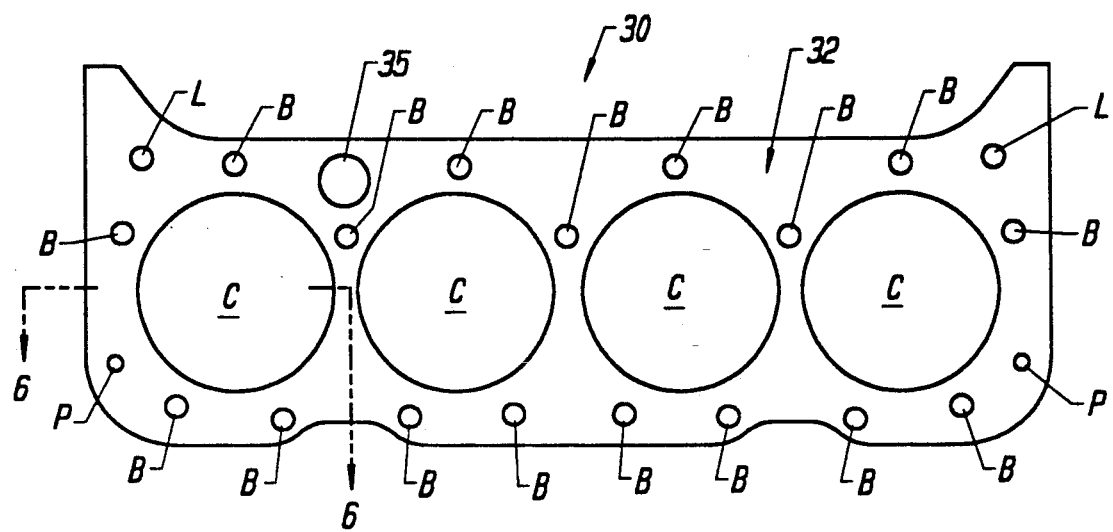
FIG. 5 is a plan view of a head gasket according to the present invention which can be used in place of the conventional head gasket of FIG. 3.
Figure 6:
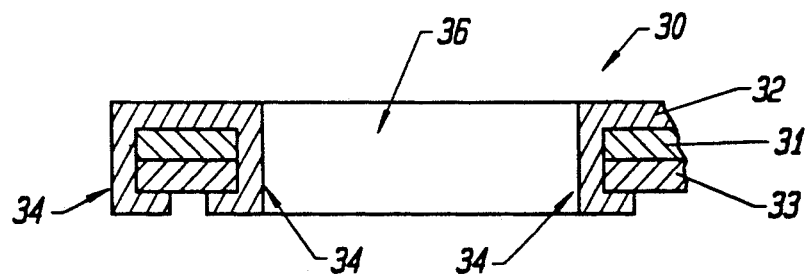
FIG. 6 is a partial cross-sectional view taken in the direction of lines 6—6 of FIG. 5.

Referring to FIGS. 5 and 6, there is provided in accordance with the present invention a head gasket designated generally as 30. In the head gasket 30 there is provided a sheet of non-asbestos paper 31, e.g. Quin-T #6308, having a thickness of approximately 0.125 inches, an upper sheet of copper 32 and a lower sheet of copper 33, e.g. #C110 copper, each having a thickness of approximately 0.013 inches.

In fabricating the gasket 30 those edges of the gasket including the gasket holes which come into contact with cooling and lubricating fluids during normal engine operation are sealed. The sealing is accomlished by extending the edges of the upper sheet of copper 32 beyond the edges of the sheets 31 and 33 and folding the edges of the sheet 32 over the edges of the sheets 31 and 33 in a U-shaped fashion so as to fully enclose the sheet 31 and the edges of the sheet 33, as shown more clearly at 34 in FIG. 6.

In the gasket 30 there is provided a plurality of holes C, a plurality of bolt holes B, a pair of pin holes P and a pair of oil holes L which correspond to the combustion chamber holes C, bolt holes B, pin holes 11 and oil holes L of the head gasket 7 of FIG. 3. In addition, there is provided along the left upper edge of the gasket 30 a single coolant hole 35.

Coolant hole 35 corresponds in size, shape and location to a hole 25 in the head assembly 6 of FIG. 4 and a hole 26 in the block assembly 5 of FIG. 2 which is in registration therewith. The hole 21 in the gasket 7 allowed coolant to flow therethrough, albeit in a restricted fashion.

As described above, since most coolant passageways between a block and head are found to be unnecessary and indeed, as described above, can actually impede cooling of the engine the gasket 30 is used to close off, i.e. block, all but one or two of the coolant passageways such as, for example, the passageways 25, 26. The manner in which this is done is illustrated in FIG. 7.

Figure 7:
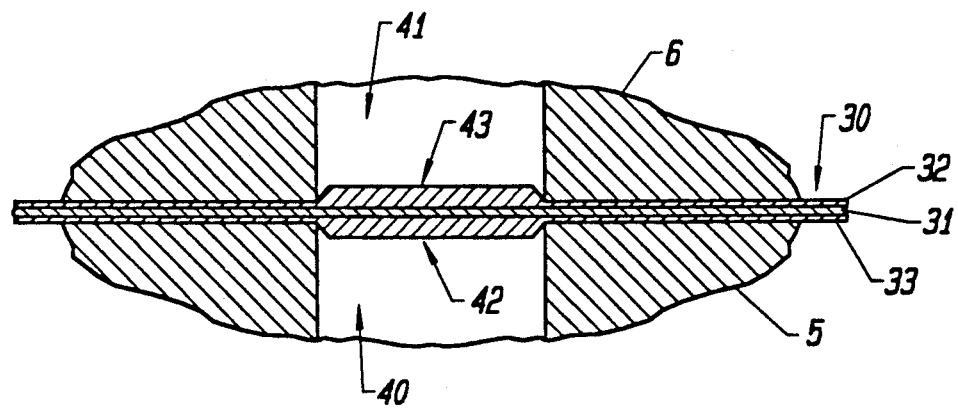
FIG. 7 is a partial cross-sectional view of the head gasket of FIG. 5 shown in place between an engine block assembly and head assembly.

Referring to the upper right center of FIGS. 2 and 4 and to FIG. 7, two of the coolant holes in the block assembly 5 and head assembly 6 are designated 40 and 41, respectively. As seen in FIG. 7, the head gasket 30 of the present invention is shown compressed between the block assembly 5 and the head assembly 6 to close off the unneeded holes, e.g. coolant holes 40 and 41, respectively. As can be seen, when the block and head assemblies 5 and 6 are bolted together with the recommended torque, the copper sheets 32 and 33 are extruded into the holes 41 and 40, respectively, as shown at 42 and 43, so as to form a more effective seal blocking said holes.

Figure 9:
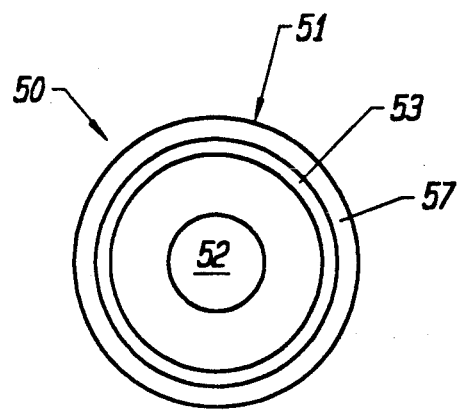
FIG. 9 is a top plan view of FIG. 8.
Figure 8:
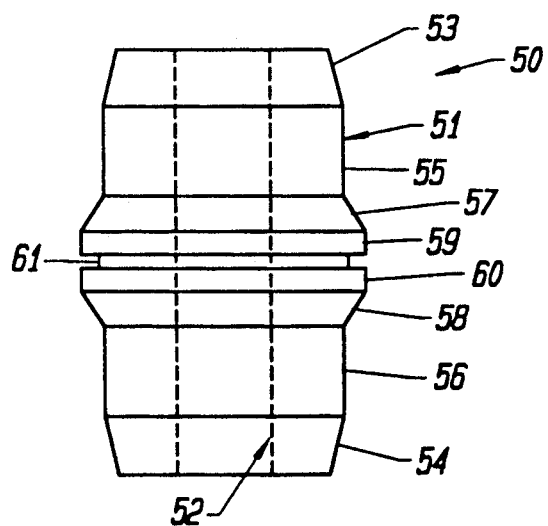
FIG. 8 is an elevation view of an insert according to the present invention.

Referring to FIGS. 8 and 9, there is further provided in accordance with the present invention an elongated hollow tubular insert 50 which may be used in combination with a conventional head gasket for retaining coolant and lubricant in their respective passageways or in combination with the head gasket 30 of the present invention. As seen in FIG. 8, the insert 50 comprises an elongated hollow tubular body member 51 comprising a cylindrical bore 52. Opposite ends of the body member 51 comprise inwardly tapered annular surfaces 53 and 54. The surfaces 53 and 54 have a taper of approximately 10°. Extending from the surfaces 53 and 54 toward the center of the body member 51 there is provided a pair of cylindrical annular surfaces 55 and 56. Extending from the surfaces 55 and 56 there is provided a pair of outwardly tapered annular surfaces 57 and 58. Surfaces 57 and 58 have a taper of approximately 60°. Surfaces 57 and 58 are terminated by a pair of cylindrical annular surfaces 59 and 60. Located in the center of the body member 51 between the surfaces 59 and 60 there is provided an annular recess 61. Recess 61 is approximately 1/16" wide and 1/32" deep and allows the tapered surfaces 57 and 58 to be more easily compressed and form a fluid-tight seal with the surfaces 64 and 65. The overall length of the body member 51 is approximately 1⅛". The outside diameter of the surfaces 51 and 56 and the surfaces 59 and 60 and the interior diameter of the bore 52 depends on the diameter of the hole into which the insert 50 is inserted, as shown more clearly in FIG. 10.

Figure 10:
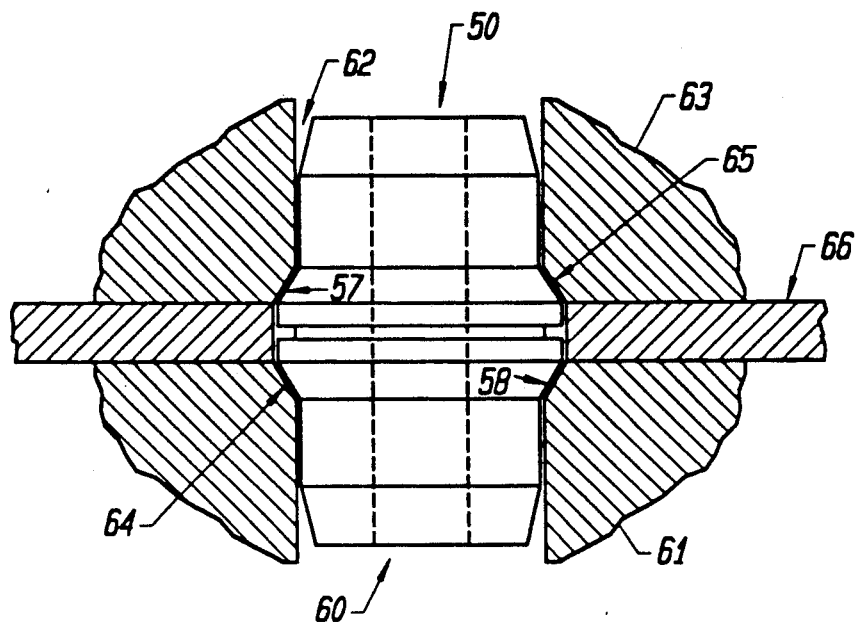
FIG. 10 is a partial cross-sectional view of the insert of FIG. 8 in place between an engine block assembly and head assembly.

Referring to FIG. 10, there is shown a partial cross-sectional view of the insert 50 inserted in a coolant passageway 60 located in an engine block 61 and a coolant passageway 62 located in an engine head 63. To prepare the block 61 and head 63 for receiving the insert 50, the passageways 60 and 62 are provided with countersunk surfaces 64 and 65, respectively. The surfaces 64 and 65 correspond to and conform with the surfaces 58 and 57 of the insert 50, respectively. As the block 61 and head 63 are bolted together with a head gasket 66 located therebetween, the surfaces 57 and 58 of the insert 50 form a fluid-tight seal with the countersunk surfaces 65 and 64 in the head 63 and block 61, respectively. As will be appreciated, insert 50 provides additional protection against the migration of fluid from either a coolant or a lubricant passageway in an engine.

While a preferred embodiment of the present invention is described above, it is contemplated that various modifications may be made thereto without departing from the spirit and scope of the present invention. For example, while copper and asbestos are preferred for the gasket 30, other materials which provide the same functional characteristics and are compatible with the engine materials, temperatures and pressures may be used. Accordingly, it is intended that the embodiment described be considered only as an illustration of the present invention and that the scope thereof should not be limited thereto but be determined by reference to the claims hereinafter provided and their equivalents.

What is claimed is:

1. A method of preventing the intermixing of coolant, lubricant and combustion gases in and reducing the engine temperature of a liquid-cooled internal combustion engine having a number of fluid passageways in a block and head assembly which are normally in fluid communication through openings therebetween, comprising the steps of:

inserting between said block and head assembly a lamination comprising a first sheet of material, a second sheet of material, and a sheet of nonmetallic material disposed between said first and said second sheets of material, said first and said second sheets of material comprising a material which extrudes into and closes off a majority of said openings so as to prevent a flow of fluid therefrom and reduce engine temperature when said block and head assemblies with said lamination disposed therebetween covering said majority of said openings are bolted together; and bolting said block and head assemblies together with said lamination covering said majority of said openings so as to cause said sheets of metal to extrude into said majority of said openings.

2. A method according to claim 1 wherein said first and said second sheets of material comprise copper.

3. A method according to claim 1 wherein said first and said second sheets of metal comprise copper and said sheet of nonmetallic material comprises non-asbestos paper.

4. A method according to claim 3 wherein the thickness of said first and said second sheet of copper comprises approximately 0.013 inches and the thickness of said sheet of non-asbestos paper comprises approximately 0.125 inches.

5. A method according to claim 3 wherein the combined thickness of said first and second sheets of copper and said sheet of non-metallic material is in excess of 150 mils.

6. A method according to claim 1 comprising the step of providing a predetermined number of holes in said lamination which extend through said first and said second sheets of material and said sheet of nonmetallic material and which are in registration with corresponding openings in said fluid passageways in said block assembly and said fluid passageways in said head assembly for allowing fluid to pass therebetween.

7. A method according to claim 1 wherein the edges of said first sheet of material are folded tightly over the edges of said sheet of nonmetallic material and said second sheet of material so as to enclose said sheet of nonmetallic material therebetween.

8. A method for preventing fluid migration from a hole in a fluid passageway in a block assembly and from a corresponding hole in a fluid passageway in a head assembly through a head gasket located between said block and head assemblies in an internal combustion engine comprising the steps of:

providing a countersunk tapered surface in each of said holes;

inserting in said holes an elongated hollow tubular insert, said insert having a pair of outwardly tapered annular surfaces located in the center thereof for mating with said countersunk tapered surfaces in said holes and an annular recess located between said pair of outwardly tapered annular surfaces for purposes of improving the fit between said outwardly tapered annular surfaces and said countersunk tapered surfaces for providing a fluid-tight fluid passageway between said block and head assemblies when said block and head assemblies are bolted together.

9. A method according to claim 8 wherein said insert comprises an inwardly tapered annular surface on each end thereof for purposes of faciliting the insertion of said inset in said openings in said head and block assemblies.

10. A method according to claim 9 wherein said insert is approximately 1⅛ inches long.

11. Apparatus for preventing the intermixing of coolant, lubricant and combustion gases in a liquid-cooled internal combustion engine having a block assembly and a head assembly which are adapted to be bolted together, each of said block and head assemblies being manufactured with a plurality of fluid passageways for conducting coolant in said assembly, each of said passageways in a first one of said assemblies having an opening in a surface thereof facing the other of said assemblies for allowing fluid to flow between the assemblies, comprising:

a lamination of a first sheet of material, a second sheet of material, and a sheet of nonmetallic material disposed between said first and said second sheets of material, said first and said second sheets of material comprising a material which extrudes into and closes said opening in a majority of said plurality of fluid passageways so as to prevent a flow of fluid therefrom and reduce engine temperature when said block and head assemblies with said lamination disposed therebetween are bolted together.

12. Apparatus according to claim 11 wherein said first and said second sheets of material comprise copper.

13. Apparatus according to claim 11 wherein said first and said second sheets of material comprise copper and said sheet of nonmetallic material comprises non-asbestos paper.

14. Apparatus according to claim 11 comprising at least one hole which extends through said first and said second sheets of material and said sheet of nonmetallic material and which is in registration with said opening in one of said fluid passageways in said block assembly and said opening in one of said fluid passageways in said head assembly for allowing fluid to pass therebetween.

15. Apparatus according to claim 11 wherein the edges of said first sheet of material are folded tightly over the edges of said sheet of nonmetallic material and said second sheet of material so as to enclose said sheet of nonmetallic material therebetween.

16. Apparatus according to claim 13 wherein the thickness of said first and said second sheet of copper comprises approximately 0.013 inches and the thickness of said sheet of non-asbestos paper comprises approximately 0.125 inches.

17. An apparatus according to claim 11 wherein the combined thickness of said first and second sheets of material and said sheet of non-metallic material is in excess of 150 mils.

18. Apparatus for preventing the intermixing of coolant, lubricant and combustion gases in an internal combustion engine having a block assembly and a head assembly which are adapted to be bolted together, each of said block and head assemblies being manufactured with at least one fluid passageway for conducting coolant in said assembly, said passageway in each of said assemblies having an opening for allowing fluid to flow between the assemblies, comprising:

an elongated hollow tubular insert, said insert including a body member, said body member having a pair of outwardly tapered annular surfaces located in the center thereof for mating with corresponding countersunk tapered surfaces in said opening in said fluid passageway in said block assembly and said opening in said fluid passageway in said head assembly;

an annular recess located between said pair of outwardly tapered annular surfaces for purposes of improving the fit between said outwardly tapered annular surfaces and said countersunk tapered surfaces when said block and head assemblies are bolted together; and a cylindrical portion at each end thereof which extends from said annular tapered surfaces for providing a fluid-tight fluid passageway between said block and head assemblies when said assemblies are bolted together.

19. Apparatus according to claim 18 wherein said body member comprises an inwardly tapered annular surface on each end thereof for purposes of facilitating the insertion of said body member in said openings in said head and block assemblies.

20. Apparatus according to claim 19 wherein said insert is approximately 1⅛ inches long.

* * * * *

UNITED STATES PATENT AND TRADEMARK OFFICE
CERTIFICATE OF CORRECTION

PATENT NO. : 5,303,943
DATED : April 19, 1994
INVENTOR(S) : James M. Batty, Jr.

It is certified that error appears in the above-identified patent and that said Letters Patent is hereby corrected as shown below:

```
Title page, item [54], "ASSEMNLY" should be --ASSEMBLY--.
Column 1, line 1, "ASSEMNLY" should be --ASSEMBLY--.
Column 1, line 21, before "block" insert --a--.
Column 7, line 28, "inset" should be --insert--.
```

Signed and Sealed this

Second Day of August, 1994

Attest:

BRUCE LEHMAN

*Attesting Officer*   *Commissioner of Patents and Trademarks*